3,489,712
COMPOSITION AND METHOD FOR MOUNTING
SPECIMENS ON SLIDES
Newton G. Leveskis, 49 Vallecito Lane,
Walnut Creek, Calif. 94596
No Drawing. Original application July 15, 1964, Ser. No. 382,954. Divided and this application Aug. 1, 1968, Ser. No. 763,460
Int. Cl. C08f 19/10
U.S. Cl. 260—33.6
4 Claims

ABSTRACT OF THE DISCLOSURE

Mounting medium for use in the mounting of specimens on microscopic slides formed from a copolymer of a vinyl substituted benzene, methyl methacrylate, and an acrylate ester in a solvent.

---

This is a division of application, Ser. No. 382,954, filed July 15, 1964.

This invention relates to a method and composition especially adapted for the preparation of microscope slides and the like. More particularly, it provides a composition that can be used as a mounting medium for purposes of coating and causing preservation and adhesion of the specimen to the slide.

To date, there has been no wholly satisfactory slide mounting medium available. Generally, the materials that have been used have at least one serious disadvantage. Some formulations such as those utilizing Canada balsam in a solvent or a piccolyte resin in a solvent as well as other well-known commercially available materials discolor with time especially under the influence of heat and or light such as the ultraviolet wave lengths. This is obviously undesirable when it is considered that these are the very conditions encountered when the slide is placed in many types of microscopes.

Other formulations have been devised to avoid this discoloration problem and other problems but have only succeeded in replacing these disadvantages with new ones. It is clear that the medium should adhere firmly to the slide and provide a hard surface in order that the slide have the desired longevity. Some of the newly proposed polymeric materials such as those described by Groat in Stain Technology 25, 87–94 (April 1950) result in a soft film which does not have the requisite ability to adhere to the slide surface. Moreover, this particular material is somewhat difficult to prepare in accordance with the author's directions.

It has now been discovered that a composition having all of the desired properties can be prepared. The new material provided by this invention is a copolymer of a vinyl substituted benzene, methyl methacrylate, and an acrylate ester. This new material, as will be demonstrated hereinafter, adheres tenaciously to the slide surface. It is of optimum hardness and protection to the specimen disposed on the slide. At the same time it is highly resistant to discoloration such as the yellowing normally associated with the repeated exposure of older preparation to light and heat. In addition to all of this, the new materials are simple and straightforward with respect to their preparation.

The starting ingredients for preparing the new copolymers can be adjusted in amount so that any desired refractive index can be obtained in the end product. At the present time it is considered desirable for the mounting medium to have a refractive index as close to that of the glass slide as possible. This is easily achieved with the present materials although other indices can be obtained by adjusting the relative proportions within the limitations to be described.

More specifically, the copolymer has as one ingredient a vinyl substituted benzene. In the preferred embodiment this entity is either styrene or a vinyl toluene (this can be considered a vinyl substituted benzene which additionally has a methyl substituent) which may include any of the isomers or mixtures thereof.

The copolymer further includes methyl methacrylate.

The third and remaining essential component of the copolymer is an acrylate ester. This entity may be defined in the preferred embodiment as an ester of acrylic acid, and where the esterifying group has a branched carbon chain of about 4 to 10 carbon atoms. Preferably this branched chain is a saturated hydrocarbon.

The amounts of the above components of the copolymer are varied so as to control the properties of the end product. In general, the vinyl substituted benzene such as styrene is used to give hardness to the end product and thus is used in an amount sufficient to create this condition.

The vinyl substituted benzene creates a higher refractive index in the copolymer with increasing amounts. The methyl methacrylate is utilized to balance the vinyl substituted benzene and to cause a lowered resultant refractive index of the copolymer. Consequently, the methyl methacrylate component is added in an amount sufficient to adjust the refractive index of the copolymer product to whatever may be the desired value. As mentioned, this will frequently be about that of the glass of the slide being prepared. It will be appreciated that at other times it may be desirable to create a different refractive index from the glass so as to obtain better edge detail when the slide is viewed. In this event it is simply a matter of varying the proportions of the ingredients such as by increasing or decreasing the methyl methacrylate content.

The other component is the acrylate ester of the type defined above. The primary purpose of this component in the polymer is to impart adhesive characteristics to the copolymer with respect to the slide substrate and should be added in an amount that will accomplish this purpose. Generally, the addition of the acrylate ester serves to lower the over-all refractive index of the copolymer. Adjustment of the vinyl substituted benzene content upwardly will counterbalance this effect.

From the foregoing it will be seen that the three components all cooperate and are essential in achieving the total effective product having the desired physical property. The desired physical properties are not the same for all users. The properties of the present materials are variable within acceptable limits by adjusting the relative proportions of the components. It has been found that in general acceptable products within the present concept are obtainable where the acrylate ester, methyl methacrylate, and vinyl substituted benzene components are present in the copolymer in the proportions of about 1:1–1.8:1.8–7 parts by weight respectively. It should be appreciated that this is only an approximate usable range intended as a guide for using this invention.

The copolymer may be made in conventional fashion. The selected components are mixed together in a reaction vessel in the appropriate amounts and reacted together to form the copolymer. Generally this will require the addition of a suitable initiator such as any of the organic peroxides or other free radical catalysts. An example of a suitable material for this purpose is benzoyl peroxide due to its short half life by reason of which little or none will remain in the end product.

In executing the reaction in the presence of the catalyst heat will generally be applied for a time sufficient to cause the reaction to go to completion and to break down the remaining peroxide catalyst so that it will not be present in the end product. The following example will illustrate preparation of these new materials.

EXAMPLE OF PREPARATION

A 1,000 ml. round bottom flask was selected as the reaction vessel and fitted with a water condenser. The following materials were added to the flask:

| | Grams |
|---|---|
| Mixed isomers of vinyl toluene | 165 |
| 2-ethyl hexyl acrylate | 87.5 |
| Methyl methacrylate | 87.5 |
| Toluene | 250 |
| 2,2'-azo-bis(isobutyronitrile) | .5 |

The above materials were heated on a boiling water bath for 12 hours. The mass polymerized to a clear, water-white syrup. The refractive index of the liquid was $n(D,20)=1.518$.

For ease of use the copolymer is employed in a diluted form by the addition of a suitable solvent for the polymer. A typical useable organic fluid for this purpose is toluene.

A plurality of polymers were made in the above manner from a number of different materials and proportions. The compositions of these copolymers together with the significant preparative details are given below.

(A)

| | Grams |
|---|---|
| Vinyl toluene (mixed ortho and para isomers) | 3.3 |
| 2 ethyl hexyl acrylate | 1.75 |
| Methyl methacrylate | 1.75 |
| Benzoyl peroxide (active oxygen 6.58%) | .002 |

(B)

| | |
|---|---|
| Vinyl toluene (mixed ortho and para isomers) | 3.3 |
| Methyl methacrylate | 3.3 |
| Benzoyl peroxide (A.O. 6.58%) | .002 |

(C)

| | |
|---|---|
| Styrene | 3.3 |
| 2 ethyl hexyl acrylate | 1.75 |
| Methyl methacrylate | 1.75 |
| Benzoyl peroxide (A.O. 6.58%) | .002 |

(D)

| | |
|---|---|
| Vinyl toluene (mixed ortho and para isomers) | 3.3 |
| Iso butyl acrylate | 1 |
| Methyl methacrylate | 1.75 |
| Benzoyl peroxide (A.O. 6.58%) | .002 |

(E)

| | |
|---|---|
| Styrene | 4 |
| 2 ethyl hexyl acrylate | 1 |
| Methyl methacrylate | 1 |
| Benzoyl peroxide (A.O. 6.58%) | .002 |

The above five copolymers were prepared in 25 mm. and 200 mm. test tubes by placing the materials in these tubes in a constant temperature bath for 12 hours. They were then cooled and the copolymers were diluted with toluene so as to make a 55% solution of the copolymer in the toluene.

In a similar manner six more copolymers were prepared. The listed material was placed in test tubes and heated at 100° C. for 16 hours. After completion of the reaction, these materials were also cooled and diluted with toluene to make solutions containing 55% copolymers.

(F)

| | Grams |
|---|---|
| Styrene | 4 |
| Iso butyl methacrylate | 1 |
| 2,2'-azo-bis(isobutyronitrile) | .002 |

(G)

| | |
|---|---|
| Styrene | 5 |
| 2,2'-azo-bis(isobutyronitrile) | .002 |

(H)

| | Grams |
|---|---|
| Vinyl toluene (mixed isomers) | 3.3 |
| Isobutyl acrylate | 1.75 |
| Methyl methacrylate | 1.75 |
| 2,2'-azo-bis(isobutyronitrile) | .002 |

(I)

| | |
|---|---|
| Vinyl toluene ortho isomer | 3.3 |
| 2 ethyl hexyl acrylate | 1.75 |
| Methyl methacrylate | 1.75 |
| 2,2'-azo-bis(isobutyronitrile) | .002 |

(J)

| | |
|---|---|
| Methyl methacrylate | 5 |
| 2,2'-azo-bis(isobutyronitrile) | .002 |

(K)

| | |
|---|---|
| Vinyl toluene (mixed isomers) | 3.3 |
| Isobutyl acrylate | .5 |
| Methyl methacrylate | .5 |
| 2,2'-azo-bis(isobutyronitrile) | .002 |

All of the above eleven copolymer products together with four other presently used mounting media noted in the table below were tested for adhesive abilities. This test was conducted with a micro-knife (Gardner Laboratory Inc.) as follows. All of the samples listed below were individually spread on an oak veneer so as to make a dry film having a thickness of about 1.2 mils. The film was heated overnight at 40° C. cooled to room temperature and then cut with the micro-knife. A second parallel cut was made at a distance from the first cut. The readings listed below indicate the minimum distance that the second cut had to be made relative to the first cut in order to leave a strip of film between the cuts wide enough to adhere to the surface.

All materials were used as a 55% resin solution in the solvent and had refractive indices of approximately $1.50=n(D,20)$.

TABLE I

| Copolymer: | Minimum distance between micro-knife cuts for adhesion (mils) |
|---|---|
| A | 7 |
| B | 19 |
| C | 10 |
| D | 9 |
| E | 8 |
| F | Soft film |
| G | 15 |
| H | 7 |
| I | 7 |
| J | 18 |
| K | 9 |
| 55% Canada balsam in toluene | 10 |
| 55% piccolyte resin (mw. 85 in toluene)[1] | 12 |
| Permount (proprietary mounting media) | 12 |
| Groats copolymer [2] | Soft film |

[1] Hydrogenated polyterpene.
[2] Copolymer of isobutyl methacrylate and styrene prepared according to R. A. Groat, Stain Technology, 25, 87–94 (April, 1950).

Materials in which a spacing of about 15 mils or more had to be employed in order to have sufficient surface for the strip to adhere are considered unsatisfactory from a practical standpoint. These materials were very poor with respect to their adhesion. The materials noted as producing a soft film were so poor that the test could not be performed and are considered unusable for present purposes with respect to their adhesive properties.

The following experiment illustrates the long term resistance to discoloration of the present materials. This test was made with respect to both heat resistance and resistance to discoloration by ultra violet light. All of the materials noted in the above Table I were again utilized as .5 ml. samples. These were placed in a 15 x 125 mm.

test tube and the test tubes were then exposed to ultra violet light for six hours. Samples were kept as controls so that the change in color could be easily detected.

Separate portions of the same samples were taken and handled in the same manner except that these were stoppered and heated at 60° C. for two weeks. Again change in color was noted by comparing against controls. The following observations were made:

TABLE II

| Copolymer | Observations | |
| --- | --- | --- |
| | Exposure to ultra violet light | Exposure to heat |
| A | No change | No change. |
| B | do | Do. |
| C | do | Do. |
| D | do | Do. |
| E | do | Do. |
| F | do | Do. |
| G | do | Do. |
| H | do | Do. |
| I | do | Do. |
| J | do | Do. |
| K | do | Do. |
| 55% Canada balsam in toluene | Yellowed | Yellowed. |
| 55% Piccolyte resin in toluene | do | Do. |
| Permount | do | Do. |
| Groats copolymer | No change | No change. |

The materials of the present invention are designed to be used in conventional fashion for preparing slides. Generally this may involve providing a suitable slide base such as a conventional piece of glass although other types of substrates could be employed. The specimen to be used is placed on the slide and coated (a few drops will usually suffice) with the new copolymer that is preferably carried in a solvent. Thereafter, the solvent is removed under suitable conditions. Room temperature and pressure will frequently accomplish this depending upon the solvent employed. When the solvent is removed a slide is obtained, having exceptional longevity and stability, in which the specimen is generally embedded and bonded to the glass with the copolymer in a dried, hardened and protective condition.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A mounting medium for use in slide preparation comprising a copolymer resistant to discoloration formed from a vinyl substituted benzene, methyl methacrylate, and an acrylate ester in which the esterifying group has a branched carbon chain of about 4 to 10 carbon atoms, said acrylate ester, methyl methacrylate, and vinyl substituted benzene being present in the approximate ratio of 1:1–1.8:1.8–7 parts by weight respectively.

2. A mounting medium in accordance with claim 1 and further characterized by a solvent for said copolymer.

3. A medium in accordance with claim 2 in which said solvent is toluene.

4. A medium in accordance with claim 2 wherein said acrylate ester is selected from the group consisting of 2-ethyl hexyl acrylate and isobutyl acrylate.

References Cited

UNITED STATES PATENTS 2,321,048   9/1941   Schildknecht _____ 260—80.81

OTHER REFERENCES

Schildknecht, Calvin E., Vinyl and Related Polymers, Wiley & Sons, New York, N.Y., 1957, p. 249.

Groat, Richard A., Preparation of Copolymers of Isobutyl Methacrylate and Styrene for Mounting Medic, in Stain Technology, vol. 25, No. 2, April 1950, pp. 87–90.

MORRIS LIEBMAN, Primary Examiner

J. H. DERRINGTON, Assistant Examiner

U.S. Cl. X.R.

260—80.81